Figure 1:
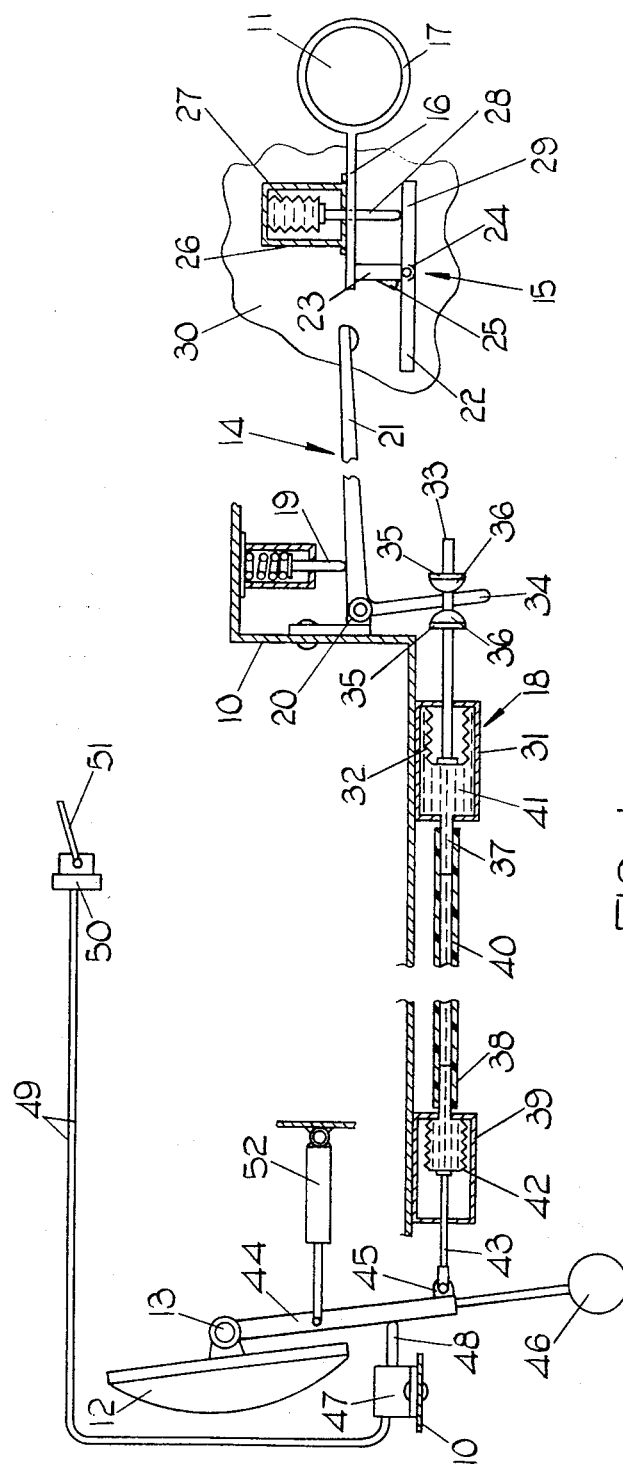

United States Patent [19]

Martin

[11] 3,955,173
[45] May 4, 1976

[54] MOTOR VEHICLE WITH HEADLAMP TILTING MECHANISM

[75] Inventor: Frederick Raymond Patrick Martin, Bromley, England

[73] Assignee: The Lucas Electrical Company Limited, Birmingham, England

[22] Filed: Mar. 5, 1975

[21] Appl. No.: 555,711

[30] Foreign Application Priority Data
Mar. 8, 1974 United Kingdom............ 10454/74

[52] U.S. Cl. .................. 240/7.1 LJ; 240/61.1; 240/62.3
[51] Int. Cl.² ............................................ B60Q 1/10
[58] Field of Search ......... 240/7.1 A, 7.1 H, 7.1 LJ, 240/61.1, 62.3

[56] References Cited
UNITED STATES PATENTS

| | | | |
|---|---|---|---|
| 3,177,355 | 4/1965 | Trowbridge | 240/7.1 LJ |
| 3,707,627 | 12/1972 | Rivoliar | 240/7.1 LJ |
| 3,828,179 | 8/1974 | Straub | 240/7.1 LJ |
| 3,903,984 | 9/1975 | Andres et al. | 240/7.1 LJ X |
| B355,095 | 1/1975 | Andres et al. | 240/7.1 LJ |

OTHER PUBLICATIONS

David Scott, Self–Leveling Headlights Glue Beams to the Road, Sept. 1968, Popular Science, pp. 122–123.

*Primary Examiner*—George H. Miller, Jr.
*Attorney, Agent, or Firm*—Holman & Stern

[57] ABSTRACT

The motor vehicle is provided with headlamps mounted on a common cross rod which is angularly sprung by means of a tilting system including a lever secured to the cross rod. The headlamps are normally urged into an extreme downwardly tilted position by means of a manually operable device. In one form, the manually operable device takes the form of a solenoid having an operating rod which engages lever attached to the cross rod. The solenoid is electrically connected with a manually operable headlamp lighting switch. The arrangement is such that when the solenoid is de-energised, the operating rod thereof urges the lever into an extreme position in which the headlamps are tilted downwardly. When the headlamp lighting switch is operated to illuminate the headlamps, the solenoid attracts the rod and so releases the lever secured to the cross rod so that tilting of the headlamps can be effected by the headlamp tilting mechanism.

In another embodiment, the headlamp lighting switch has an operating rod which is attached to one end of a cable whose other end passes slidably through an aperture in the lever connected with the cross rod and which is operable to move the lever into a position corresponding to an extreme downward tilt of the headlamps when the lighting circuit to the headlamps is opened, but is arranged to release the lever for movement under the action of the headlamp tilting system when the lighting circuit of the headlamps is closed.

7 Claims, 3 Drawing Figures

MOTOR VEHICLE WITH HEADLAMP TILTING MECHANISM

This invention relates to a motor vehicle with a headlamp tilting mechanism.

According to the present invention, there is provided a motor vehicle comprising 1 a body, 2 wheels upon which the body is suspended, 3 headlamps mounted on the body for tilting movement 4 a mechanism for tilting the headlamp in accordance with changes in the attitude of the vehicle body relative to wheels thereof, said mechanism including a first element pivotally mounted on the body, a second element mounted on an unsprung part of the vehicle, means biasing the first element into engagement with the second element, and transmission means interconnecting the first element and the headlamp whereby movements of the first element are transmitted to the headlamp, and (5) a manually operable device for rendering said tilting mechanism inoperative, said manually operable device being arranged, when operated, to move a portion of the transmission means so as to urge the first element out of engagement with the second element against the action of the biasing means.

Preferably, the first element is connected with a mechanical input member of a first transducer having a hydraulic output in fluid connection with a hydraulic input of a second transducer, the second transducer having a mechanical output connected with a lever which forms said portion with which said manually operable device engages.

Conveniently, said portion comprises a lever attached to an angularly movable rod upon which said headlamp is fixedly mounted.

Most advantageously, said manually operable means is arranged to be operated when a headlamp lighting switch is opened.

In one embodiment, the manually operable means includes a solenoid having a movable arm arranged, when the solenoid is de-energised, to engage said portion of the transmission means, and a supply circuit to said solenoid, said supply circuit being arranged to be closed when the headlamp switch is closed, there being a clearance between the movable arm and said portion when the solenoid is de-energised so that said portion can move during control of the tilting of the headlamp.

In another embodiment, a movable member of the headlamp operating switch is mechanically connected to a cable which is arranged to effect said movement of said portion of the transmission means when the movable member is operated to open the contacts of the headlamp operating switch.

Conveniently, said cable passes slidably through said portion, is provided with an abutment at an end thereof remote from the movable member of the switch, and a spring is disposed between the abutment and said portion, the arrangement being such that, when the headlamp operating switch is closed, there is sufficient clearance between the abutment and said portion to permit movement of said portion during control of the headlamp tilting.

Figure 2:
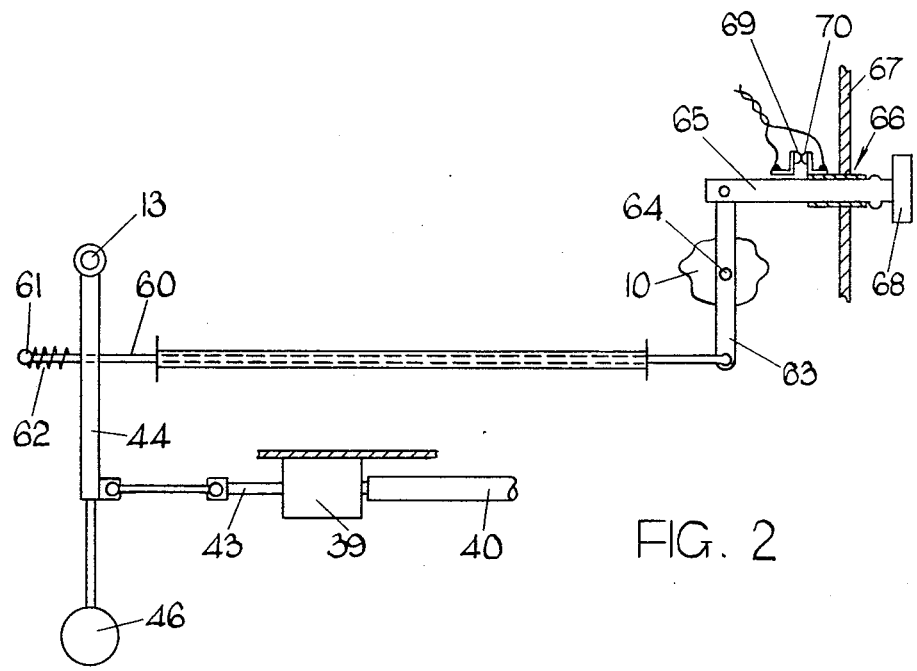
Figure 3:
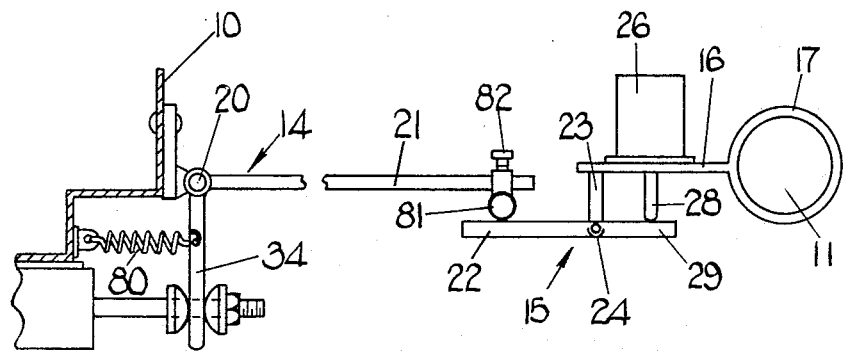

Embodiments of the present invention will now be described, by way of example, with reference to the accompanying drawings, in which:

FIG. 1 is a schematic illustration of a headlamp tilting mechanism in a motor vehicle according to the present invention, FIG. 2 is a schematic view of part of another headlamp tilting mechanism in a motor car according to the present invention, and FIG. 3 is a schematic view of part of a further headlamp tilting mechanism.

Referring now to FIG. 1 of the drawings, the motor vehicle comprises a body 10 (only partly shown) suspended on front and rear wheels (not shown), a rear axle housing 11 defining an unsprung part of the motor vehicle, and a pair of headlamps 12 (only one shown) secured on a common cross-rod 13 which extends transversely with respect to the body 10 and is angularly movable relative thereto. The motor vehicle also includes a mechanism for tilting the headlamps and a manually operable device for rendering said tilting mechanism inoperative.

The headlamp tilting mechanism comprises generally a cranked lever 14 mounted on the vehicle body 10, a pivotted lever 15 mounted on a bracket 16 secured to an axle housing 17 surrounding axle 11, a hydro-mechanical transmission 18 connecting the lever 14 with the cross rod 13, and a spring loaded plunger 19 serving to urge lever 14 into engagement with lever 15.

More particularly, the lever 14 is mounted on the vehicle body 10, i.e. a sprung part of the vehicle, through the intermediary of a horizontal pivot 20. One arm 21 of the lever 14 is urged into engagement with a portion 22 of the lever 15 by the spring loaded plunger 19 when the tilting mechanism is in operation. In FIG. 1, the mechanism is shown in an inoperative condition in which arm 21 is spaced from lever portion 22. The lever 15 is mounted on the bracket 16 through the intermediary of a depending post 23 to which it is pivotally attached by means of a horizontal pivot 24. A stop 25 limits pivotal movement of lever 15 about pivot 24 in a clockwise direction. Also mounted on the bracket 16 is a temperature expansible unit 26 which incorporates a bellows element 27 filled with a heat expansible material, in this embodiment carbon tetrachloride, the bellows element 27 having secured to a movable end thereof an output rod 28 which extends downwardly towards a portion 29 of the lever 15 on the opposite side of pivot 24 to lever portion 22. The whole assembly of unit 26, lever 15, and free end portion of arm 21 is enclosed in a flexible nylon bag 30.

The transmission 18 comprises a first transducer 31 including an expansible bellows element 32 having an input rod 33 secured to a movable end thereof. The input rod 33 passes slidably through an aperture in an arm 34 of the lever 14 and has a pair of shoulders 35 thereon. Disposed between each shoulder 35 and the arm 34 is a shock absorbing rubber bush 36. The transducer 31 has a fluid outlet 37 which is connected with a fluid inlet 38 of a second transducer 39 by means of a conduit 40. The first transducer 31 has a chamber 41 surrounding the bellows element 32 and filled with hydraulic fluid. The fluid inlet 38 of the second transducer 39 is connected with the interior of a bellows element 42 in the second transducer 39. The movable end of the bellows element 42 having an output rod 43 secured thereto. The output rod 43 projects externally of the second transducer 39 and engages a lever 44 through the intermediary of a ball and socket joint 45. The lever 44 is secured at its upper end to cross rod 13 and has mounted on its lower end a mass 46.

The manually operable device for rendering the tilting mechanism inoperative comprises a solenoid 47 mounted on the body 10 and having a movable arm 48 extending towards lever 44. The manually operable mechanism further includes a pair of electrical supply leads 49 which are connected with a source of power (not shown) through the intermediary of a combined switch unit 50 having a single operating lever 51 which, when operated, serves to complete a lighting circuit to the headlamps 12 and also to complete the circuit to the solenoid 47 through leads 49.

Lastly, the lever 44 has secured thereto a damper 52.

In the position illustrated in FIG. 1, the headlamp tilting mechanism is shown, as noted above, in an inoperative condition. In this condition, lever 51 of the switch unit 50 is in a position in which the headlamps 12 are extinguished and solenoid 47 is de-energised. In this position, movable arm 48 of the solenoid 47 is engaged with lever 44 and has urged the latter into an extreme anti-clockwise position relative to the axis of cross rod 13. In this position, bellows element 42 within the second transducer 39 has been compressed because of the interconnection between bellows element 42 and lever 44 through the intermediary of output rod 43 and ball and socket joint 45. Such compression of bellows element 42 has resulted in compression of the hydraulic fluid therein, in conduit 40 and in chamber 41. As a result of this, the bellows element 32 within second transducer 31 has been compressed and lever 14 has been moved to the position shown in FIG. 1 against the action of the spring loaded plunger 19 so that the arm 21 is spaced from lever 15. Movement of lever 14 has, of course, been brought about by pressure applied to arm 34 by the left hand shoulder 35 as viewed in FIG. 1 through the intermediary of the respective rubber bush 36. The extent of movement of the movable arm 48 is such as to bring the free end of arm 21 of lever 14 sufficiently far away from lever portion 22 that under all anticipated loads carried by the body 10 and under all anticipated driving conditions, the lever 15 will never contact the lever 14 when the latter is in the position shown in FIG. 1. It will be appreciated that if the rear of the vehicle body 10 is loaded, there will be a downward movement of the pivot 20 and therefore downward movement of lever 14. Conversely, a lightening of the load at the rear of the vehicle body 10 will cause an overall lifting of the pivot 20 and a lifting of lever 14.

If it is desired to render the headlamp tilting mechanism operative, the lever 51 is operated to close electrical contacts in switch unit 50 so that the headlamps 12 are illuminated and the solenoid 47 is energised. Energisation of the solenoid 47 causes movable arm 48 to be drawn inwardly, i.e. to the left as viewed in FIG. 1. In so doing, the movable arm 48 becomes disengaged from lever 44 and the pressure on bellows element 42 is thereby relieved. Thus, the pressure on bellows element 32 and lever 14 by the movable arm 48 is also relieved. This results in the lever 14 pivoting in a clockwise direction about pivot 20 under the action of the spring loaded plunger 19 until the arm 21 of lever 14 engages against a portion 22 of lever 15. Engagement of arm 21 against lever portion 22 causes the lever 15 to pivot in an anti-clockwise direction about pivot 24 until lever portion 29 abuts against output rod 28 of the unit 26. The purpose of the unit 26 will be described hereinafter.

Such clockwise movement of the lever 14 about pivot 20 causes a pressure to be applied to input rod 33 through the intermediary of the left hand rubber bush 36 and the left hand shoulder 35. This results in expansion of the bellows element 32, an increase in the pressure within conduit 40 and within bellows element 42, and thereby an expansion of the latter. Expansion of the bellows element 42 effects movement of output rod 43 to the left as viewed in FIG. 1 and clockwise rotation of cross rod 13 relative to the vehicle body 10. Such clockwise rotation of the cross rod 13 results in upward tilting of the headlamps 12. For a given load in the vehicle body 10, the headlamps 12 have been previously set up so that the light beams emanating from the headlamps 12 are at the desired level.

In the event of an increase in the load at the rear of the vehicle body 10, the body 10 moves downwardly relative to the rear axle 11. Thus, pivot 20 moves downwardly and because of the engagement of arm 21 of lever 14 against lever portion 22 of lever 15, the lever 14 is effectively moved in an anti-clockwise direction about pivot 20. The amount of movement is proportional to the increase in the load at the rear of the vehicle body 10. Such anti-clockwise movement of lever 14 causes arm 34 of lever 14 to urge the input rod 33 to the right as viewed in FIG. 1 and the bellows element 32 to be compressed. Such compression reduces the pressure within chamber 31, conduit 40 and bellows element 42 and causes the latter to become compressed. The amount of compression of bellows element 42 is proportional to the amount of anti-clockwise movement of the lever 14 about pivot 20. Such compression of bellows element 42 causes movement of output rod 43 to the left as viewed in FIG. 1 and anti-clockwise rotation of cross rod 13. In this manner, the headlamps 12 are tilted downwardly by an amount which compensates for the change in the attitude of the vehicle body relative to the wheels as a result of an increase in the load at the rear of the vehicle body. The arrangement is such that the light beams emanating from the headlamps 12 are maintained at the said desired level.

If the load on the vehicle body is lightened, the rear of the vehicle body 10 moves upwardly relative to the rear axle 11 so that the pressure on lever portion 22 by arm 21 tends to be relieved. However, the spring loaded plunger 19 retains arm 21 in engagement with the lever portion 22 so that an effective clockwise rotation of lever 14 about pivot 20 occurs. This results in expansion of bellows element 32 and an upward tilting of the headlamps 12 as described hereinabove. The amount of upward tilting of the headlamps 12 is chosen so that the light beams emanating from the headlamps 12 are maintained at said desired level in spite of the lightening of the load at the rear of the vehicle body 10.

Because the transmission 18 is partly hydraulic in nature, it will be subject to changes in pressure as a result of changes in ambient temperature. Clearly, this is undesirable as it will effect the setting of the headlamps. Accordingly, the unit 26 is provided. If an increase in ambient temperature occurs, such an increase in the temperature would normally cause an increase in the pressure in the hydraulic system with the result that the headlamps 12 will be tilted upwardly. However, this is compensated for by expansion of bellows element 27 causing clockwise movement of lever 15 about pivot 24. Such clockwise movement of lever 15 lifts lever portion 22 and thereby lifts arm 21 of lever 14. Consequently, the lever 14 is moved in an anti-clockwise direction about pivot 20 and causes the bellows element 32 to be compressed by movement of input rod 33 to the left as viewed in FIG. 1. The amount of movement of lever 15 is chosen to be such that the relief in pressure caused by compression of bellows element 32 equals the increase in pressure caused by expansion of the hydraulic fluid under the increased ambient temperature conditions.

Conversely, a decrease in ambient temperature causes a decrease in the hydraulic pressure in the transmission 18 with the result that, but for the presence of unit 26, the headlamps 12 would be undesirably tilted downwardly. However, when the ambient temperature decreases, bellows element 27 contracts and draws output rod 28 upwardly. Such movement of rod 28 has a tendency to relieve the pressure between the output rod 28 and lever portion 29 of lever 15. However, this pressure is maintained because of the provision of the spring loaded plunger 19 which urges arms 21 downwardly against lever portion 22 and causes anticlockwise pivotal movement of lever 15 about pivot 24. Downward movement of arm 21 results in anticlockwise movement of lever 14 about pivot 20 and expansion of bellows element 32 to increase the hydraulic pressure by an amount which compensates for the decrease therein as a result of the lower ambient temperature.

The mass 46 causes independent tilting of the headlamps 12 under conditions of relatively prolonged braking and acceleration. It will be appreciated that braking of the motor vehicle causes a downward dipping of the front of the vehicle body 10 and an upward tilting of the headlamps 12 is desirable to compensate for this. Under braking conditions, the mass 46 moves forwardly of the motor vehicle 10 relative to cross rod 13 and thereby effects an anti-clockwise movement of lever 44 about the axis of cross rod 13. Thus, cross rod 13 itself is moved in an anti-clockwise direction and upward tilting of the headlamps 12 occurs. Similarly, under conditions of acceleration, the inertia in the mass 46 causes it to lag behind cross rod 13 with a result that the latter is moved in an anti-clockwise direction to cause downward tilting of the headlamps 12 to compensate for lifting of the front of the vehicle body 10 under acceleration conditions.

It is to be appreciated that the levers 14 and 15 and the transmission 18 does not normally operate sufficiently quickly for the change in the attitude of the vehicle body 10 relative to the wheels under acceleration or braking conditions to be sensed thereby and passed to the headlamps 12 in time. Consequently, the mass 46 is provided. The damper 52 merely serves to damp out any very short term vibrations in the system which would cause an undesirable short term wavering of the light beams projected by the headlamps 12.

It is to be appreciated that, when the solenoid 47 is energised and the movable arm 48 moved to the left as viewed in FIG. 1, there is sufficient clearance between the free end of movable arm 48 and the lever 44 for the headlamp mechanism to function correctly.

When the headlamps 12 are no longer required, the lever 51 is operated to de-energise the headlamps and such movement of the lever 51 also de-energises the solenoid 47. This results in movable arm 48 being moved to the right as viewed in FIG. 1, since the arm 48 is inherently biased by a spring (not shown) which is stronger than the spring loading plunger 19. The movable arm 48 adopts the position shown in FIG. 1 and renders the headlamp tilting mechanism inoperative as described above.

Referring now to FIG. 2, a modified arrangement of manually operable device for rendering the tilting mechanism inoperative is illustrated. In this embodiment, in place of solenoid 47, a mechanical linkage is provided. This mechanical linkage comprises a Bowden cable 60 having one end thereof passing slidably through an aperture (not shown) in lever 44. The cable 60 at this end terminates in an abutment 61 and a spring 62 is disposed on the cable 60 between abutment 61 and lever 44. At the opposite end thereof to abutment 61, the cable 60 is attached to a lever 63 mounted on the body 10 through the intermediary of a pivot 64. At the opposite end of lever 63 to its attachment to cable 60, the lever 63 is pivotally attached to a rod 65 which is formed as a slidable element in a headlamp switch unit 66 mounted in an instrument panel 67 of the motor vehicle. The rod 65 extends through the panel 67 and has a knob 69 attached thereto to enable manual operation of the switch unit 66. In the position shown in FIG. 2, the switch unit 66 is in a position in which a movable contact 69 on the rod 65 is engaged with a fixed contact 70, thus completing an electrical supply circuit to the headlamps (not shown in FIG. 2). In this position, the cable 60 is in a position in which abutment 61 has moved sufficiently far away from lever 44 for spring 62 to be fully expanded and to be spaced from lever 44. Thus, in this position of cable 60, the headlamp tilting mechanism is operable to effect control of the tilting of the headlamps as described with reference to FIG. 1 of the drawings.

When the headlamps 12 are no longer required, the knob 68 is manually depressed to separate contacts 69 and 70. Such depression of knob 68 causes movement to the left of rod 65 and anti-clockwise rotation of lever 63 about pivot 64. This moves cable 60 to the right as viewed in FIG. 2 and causes abutment 61 to act on lever 44 through the intermediary of spring 62 to move lever 44 in an anticlockwise direction about the axis of cross rod 13 into a position corresponding to that shown in FIG. 1 in which the lever 14 is disengaged from lever 15 (levers 14 and 15 are not shown in FIG. 2).

Referring now to FIG. 3 of the drawings, the mechanism illustrated therein is similar to that described with reference to FIG. 1. However, in this embodiment, the spring loaded plunger 19 is replaced by a tension spring 80 connected between the body 10 and arm 34 of lever 14. However, the effect of tension spring 80 is the same as that of plunger 19. Additionally, arm 21 of lever 14 is provided with an element 81 which is longitudinally slidable relative thereto and is provided with a securing screw 82 to enable the element 81 to be fixed in any desired longitudinal position on lever 21. The element 81 is urged by spring 80 into engagement with lever portion 22 of lever 15 when the headlamp tilting mechanism is in operation. The element 81 is provided to enable ready adjustment of the effective length of arm 21 for setting up purposes.

I claim:

1. A motor vehicle comprising (1) a body, (2) wheels upon which the body is suspended, (3) headlamps mounted on the body for tilting movement, (4) a mechanism for tilting the headlamp in accordance with changes in the attitude of the vehicle body relative to wheels thereof, said mechanism including a first element pivotally mounted on the body, a second element mounted on an unsprung part of the vehicle, means biasing the first element into engagement with the second element, and transmission means interconnecting the first element and the headlamp whereby movements of the first element are transmitted to the headlamp, and (5) a manually operable device for rendering said tilting mechanism inoperative, said manually operable device being arranged, when operated, to move a portion of the transmission means so as to urge the first element out of engagement with the second element against the action of the biasing means.

2. A motor vehicle as claimed in claim 1, wherein the first element is connected with a mechanical input member of a first transducer having a hydraulic output in fluid connection with a hydraulic input of a second transducer, the second transducer having a mechanical output connected with a lever which forms said portion with which said manually operable device engages.

3. A motor vehicle as claimed in claim 1, wherein said portion comprises a lever attached to an angularly movable rod upon which said headlamp is fixedly mounted.

4. A motor vehicle as claimed in claim 1, wherein the manually operable means includes a solenoid having a movable arm arranged, when the solenoid is de-energised, to engage said portion of the transmission means, and a supply circuit to said solenoid, said supply circuit being arranged to be closed when the headlamp switch is closed, there being a clearance between the movable arm and said portion when the solenoid is de-energised so that said portion can move during control of the tilting of the headlamp.

5. A motor vehicle as claimed in claim 1, wherein said manually operable means is arranged to be operated when a headlamp lighting switch is opened.

6. A motor vehicle as claimed in claim 5, wherein a movable member of the headlamp operating switch is mechanically connected to a cable which is arranged to effect said movement of said portion of the transmission means when the movable member is operated to open the contacts of the headlamp operating switch.

7. A motor vehicle as claimed in claim 6, wherein said cable passes slidably through said portion, is provided with an abutment at an end thereof remote from the movable member of the switch, and a spring is disposed between the abutment and said portion, the arrangement being such that, when the headlamp operating switch is closed, there is sufficient clearance between the abutment and said portion to permit movement of said portion during control of the headlamp tilting.

* * * * *